United States Patent [19]
Shutov et al.

[11] Patent Number: 5,688,448
[45] Date of Patent: Nov. 18, 1997

[54] METHOD FOR PRODUCING BIODEGRADABLE PRODUCTS

[75] Inventors: Fyodor Shutov; George Ivanov, both of Cookeville, Tenn.; Hamid Arastoopour, Downers Grove, Ill.

[73] Assignee: The Illinois Institute of Technology, Chicago, Ill.

[21] Appl. No.: 458,337

[22] Filed: Jun. 2, 1995

Related U.S. Application Data

[63] Continuation-in-part of Ser. No. 35,436, Mar. 24, 1993, abandoned.

[51] Int. Cl.$^6$ .................................................. B29C 43/02
[52] U.S. Cl. .................... 264/54; 264/122; 264/124
[58] Field of Search ..................... 264/122, 54, 124

[56] References Cited

U.S. PATENT DOCUMENTS

| | | | |
|---|---|---|---|
| 3,023,136 | 2/1962 | Himmelheber et al. | 264/122 |
| 3,686,384 | 8/1972 | Runton . | |
| 3,880,788 | 4/1975 | Rudolphy . | |
| 3,903,229 | 9/1975 | Mark . | |
| 3,923,729 | 12/1975 | Clendinning et al. . | |
| 3,932,319 | 1/1976 | Clendinning et al. . | |
| 4,098,765 | 7/1978 | Kays et al. | 264/124 |
| 4,234,658 | 11/1980 | Chow | 264/122 |

(List continued on next page.)

FOREIGN PATENT DOCUMENTS

| | | | |
|---|---|---|---|
| 3118021 | 11/1982 | Germany | 264/122 |
| A 40 27 786 | 4/1992 | Germany . | |
| 585079 | 12/1977 | U.S.S.R. | 264/122 |

OTHER PUBLICATIONS

Derwent Publications Ltd., London GB; AN 385316 & JP, A, 4 283 242 (Office Acme KK) 8 Oct. 1982.
Derwent Publications Ltd., London GB; AN 33681C & JP, A, 55 043 134 (Ataki T) 27 Mar. 1980.
Derwent Publications Ltd., London GB; AN 37281U & JP, B, 48 020 774 (Hitachi Shipbuilding) (undated).
Patent Abstracts of Japan, vol. 17, no. 86(C-1028) 19 Feb. 1993.
Kirk-Othmer Encyclopedia of Chemical Technology, 4th Edition, vol. 2, pp. 53-55 and 62 (undated).
Italienische Kuche 100 Rezepte und farbige Abbildungen (1985) p. 149, Die Herstel-Lung Von Pizza.
Rompps Chemie-Lexikon, Achte, neubearbeitete und erweiterte Auflage, Dr. Otto-Albrecht Neumuller, Franckh'sche Verlagshandlung Stuggart, pp. 3945-3947, 1987.
Kochen heute Dasgrosse Grundkochbuch, Uberarbeitete und erganzte Neuausgabe, Arne Kruger, Annette Wolter, Grafe und Unzer, pp. 129-130 (undated).

*Primary Examiner*—Allan R. Kuhns
*Attorney, Agent, or Firm*—Wallenstein & Wagner, Ltd.

[57] ABSTRACT

A method of making a molded biodegradable food receptacle product including the steps of grinding up non-toxic agricultural waste plant material like soy, rice, oat and wheat hulls into particles having a range of sizes so that, if compressed in a mold, the smaller particles substantially fill the spaces between the much larger ones. Where necessary, there is added to the particles a natural and biodegradable binder-forming material, like an edible vegetable oil which will bind like a food receptacle the particles together to form a leak-proof receptacle, when inserted into a mold and compressed by the mold walls at elevated temperatures will produce compact well bound together particles. Without any chemical or physical pretreatment of the ground particles and particle-binder feed mix, the unpretreated mix, with or without small amounts of coloring, aromatic or foaming agents, is fed into a pressure-applying mold. The initial pressure and temperature preferably squeezes inherent binding-forming oils from the preferably seed hulls which freely flow through the mix. The high pressure is then partially reduced and the mold temperature is elevated to maximize the binding action of the binder materials as they solidify.

23 Claims, 5 Drawing Sheets

U.S. PATENT DOCUMENTS

| | | |
|---|---|---|
| 4,337,181 | 6/1982 | Otey et al. . |
| 4,357,194 | 11/1982 | Stofko . |
| 4,496,718 | 1/1985 | Rudy . |
| 4,519,808 | 5/1985 | Stisen . |
| 4,627,951 | 12/1986 | Shen . |
| 4,810,446 | 3/1989 | Sylvest . |
| 4,933,125 | 6/1990 | Reiniger . |
| 5,017,319 | 5/1991 | Shen . |
| 5,077,071 | 12/1991 | Strop . |
| 5,096,650 | 3/1992 | Renna . |
| 5,108,677 | 4/1992 | Ayres . |
| 5,133,834 | 7/1992 | Capps . |
| 5,167,885 | 12/1992 | Rice et al. ............................ 264/122 |
| 5,354,621 | 10/1994 | Liebermann . |

| SCREEN MESH NO. | SMALLEST DIA. SCREENED (μ) | WEIGHT, KG | WEIGHT PERCENT |
|---|---|---|---|
| 10 | 2,000 | 0.000 | -- |
| 20 | 840 | 1.136 | 11.38 |
| 40 | 420 | 5.750 | 57.44 |
| 60 | 250 | 2.740 | 27.37 |
| 80 | 177 | 0.350 | 3.50 |
| 100 | 149 | 0.034 | 0.34 |
| TOTAL | | 10.010 | 100.00 |

| SCREEN MESH NO. | SMALLEST DIA. SCREENED ($\mu$) | WEIGHT, KG | WEIGHT PERCENT |
|---|---|---|---|
| 10 | 2,000 | 0.000 | -- |
| 20 | 840 | 1.106 | 17.63 |
| 40 | 420 | 4.248 | 67.72 |
| 60 | 250 | 0.640 | 10.20 |
| 80 | 177 | 0.178 | 2.84 |
| 100 | 149 | 0.100 | 1.61 |
| TOTAL | | 6.272 | 100.00 |

| SCREEN MESH NO. | SMALLEST DIA. SCREENED (μ) | WEIGHT, KG | WEIGHT PERCENT |
| --- | --- | --- | --- |
| 5 | 4,000 | -- | -- |
| 10 | 2,000 | 0.488 | 7.39 |
| 20 | 840 | 3.544 | 53.68 |
| 40 | 420 | 2.114 | 32.02 |
| 60 | 250 | 0.360 | 5.45 |
| 80 | 177 | 0.078 | 1.18 |
| 100 | 149 | 0.006 | 0.09 |
| 200 | 074 | 0.012 | 0.19 |
| TOTAL | | 6.602 | 100.00 |

METHOD FOR PRODUCING BIODEGRADABLE PRODUCTS

RELATED PATENT APPLICATION

The present invention is related to that disclosed and claimed in U.S. Pat. No. 5,354,621 granted Oct. 11, 1994. This application is a continuation-in-part of application Ser. No. 08/035,436, filed Mar. 24, 1993 now abandoned.

TECHNICAL FIELD OF THE INVENTION

This invention relates to a method of making biodegradable molded products from agricultural waste (sometimes referred to as agrowaste) materials, such as rice, soy bean, wheat, oat and corn hulls. This method produces unique solid or foamed molded products which are especially suited for food receptacles. The foamed products are especially suitable for use as containers for hot or cold beverages. However, the invention also has other applications, such as the manufacture of flower pots, golf tees, as well as other products.

BACKGROUND AND SUMMARY OF THE INVENTION

The present invention capitalizes on the price differential between wood pulp at $250–300/ton and agrowastes at $10–50/ton in such markets as golf tees, plates, cups and other solid or foamed products.

The food industry, particularly carry-out fast food establishments, have the desire to substitute natural biodegradable containers for synthetic polymer containers now used to avoid, or significantly reduce, the nuisance and unsightly appearance of such containers along roadsides and their long life in landfills.

In accordance with one aspect of the invention, a biodegradable food receptacle product made of much greater than 50% and preferably at least about 90% of unpretreated ground-up, compacted, non-toxic agrowaste material particles. These particles most advantageously have a range of sizes so that, if compressed in a mold, the smaller particles substantially fill the spaces between the much larger ones. There is added, where necessary, aroma and/or color-producing additives and/or foaming agents and binder-forming materials which will aid in binding the compacted particles together, and, in the case of food receptacles, to form a leak-proof food receptacle.

The particles most advantageously are already ground-up particles obtained from a commercial milling operation, such as those operations which grind up rice, soy bean, oat, wheat, and corn hulls when separated from the seeds involved. The ranges of particle sizes obtained from such milling operations vary from smallest dimension sizes much less than 250μ to sizes in excess of 1000μ. About 70–80% by weight of these particles pass through 10 mesh but not 80 mesh and smaller screens. For best results, particle sizes in excess of about 1000μ are screened from these milling processes. The ground particles from these commercial sources have at least about 70% by weight of particles which have a smallest dimension size range from about 500μ to 1000μ. When fed to a mold it is most preferred that these commercially obtained ground particles have not been subjected to any physical or chemical pretreatment, such as dehydration or other pretreatment processes. (The addition of particle binding, addition of foaming, aromatic or coloring agents and screening of the particles are not physical or chemical pretreatment processes).

This lack of chemical pretreatment is also preferred should the milled agrowaste materials be ground up by the manufacturers of the molded products involved. In the mold, the mostly agrowaste particles are subjected to pressures and temperatures and include enough binder to produce a strong, leak-proof product. A preferably two stage molding process to be described is believed to produce the best results.

Soy bean hulls have sufficient inherent binder such that these molding pressures produce enough binder squeezed from the agrowaste particles to produce the desired product. The other seed hulls referred to will generally require the addition of a binder to the mix fed to the mold to provide the necessary amount of binder material. The nature of this added binder material constitutes a second aspect of the invention. However, whether or not a binder must be added and the nature of that binder is not intended to be a limitation to the aspects of the invention described in the previous paragraphs and in the specific two-stage process carried out in the molding operation to be described.

In accordance with the second aspect of the invention, the added binder is preferably in the form of edible oils added in small amounts so that the total amount of the binder added to the particles represents much less than 10% by weight of the binder-particle mix fed to the mold. Edible oils are inherently biodegradable and thus produce a preferably natural, molded biodegradable product.

In accordance with another aspect of the invention, the particle-binder mix fed to the mold is then initially subjected to a relatively high mold pressure which squeezes inherent binder-forming materials in the agrowaste particles to the surface and a modest elevated temperature below the binding action-producing temperature of the binder-forming materials present in the mix. Such initial temperature elevation aids in liberating the inherent binder from the particles and enables the binder to flow between the particles and to coat the same. It also reduces the time needed to reach the binder action-producing temperature in the next step of the molding process which solidifies the inherent and added binder materials involved. Then, in the next or second molding stage, the pressure in the mold is reduced to a level which allows some of the binder material which concentrates at the periphery of the mold, to reenter the interior of the mix involved. At the same time, the temperature of the mix is raised to a value which effects a binding or curing action of the binder materials by effecting the solidification thereof.

Other advantages and aspects of the invention will become apparent upon making reference to the specification, claims, and drawings to follow.

DESCRIPTION OF RELEVANT PRIOR ART

The commercially known prior art to date, for various reasons, has not proven successful in the making of low cost food receptacles. For the most part, this prior art does not use principally agrowaste materials, such as in amounts much greater than 50% and preferably at least 90% and more. Almost all of this prior art use, inefficient, costly chemical or physical pretreatment processes such as steamed dehydration processes, and the like, and most of this prior art includes toxic basic materials which do not produce food receptacles. Also, the agrowaste materials are usually incidental rather than the principal ingredients. Moreover, there is nothing stated in this prior art literature and, therefore, no teaching of using principally as the molded material unpretreated particles as received from the commercial mills, which are the preferred particles of the invention.

Examples of patents disclosing some of this prior art are U.S. Pat. Nos. 3,923,729 (Clendinning et al. Patent); 3,686,384 (Runton Patent); 5,133,834 (Capps Patent); 4,629,951 (Kuo C. Shen Patent) and German Patent DE 4027786.

U.S. Pat. No. 3,923,729 to Robert A. Clendinning discloses shaped containers, such as plant-holding containers, fabricated from material comprising biodegradable thermoplastic oxyalkanoyl polymers, desirably greater than 20 weight percent and naturally occurring products, some of which can be rice hulls. There is no suggestion or disclosure in this patent that the molded product can be a food receptacle or that seed hulls comprise the main, as distinguished from a very minor portion, of the molded product.

U.S. Pat. No. 3,686,384 to Leslie A. Runton discloses a method of producing molded articles from coffee bean hulls or from rice hulls or from mixtures thereof in which the hulls are grounds and pretreated by a dehydration process and then molded at a temperature of from 450° to 500° F. and at pressures from ½ to 10 tons per square inch, whereby the synthetic non-biodegradable resin component flows to form a resin based molded rigid article. The disclosures in general and the specific examples involve the addition of materials to the coffee, bean or rice hulls which make the product involved unsuitable in the making of a food receptacle. This patent is, therefore, not relevant to the manufacture of food receptacles.

U.S. Pat. No. 5,133,834 to Charles L. Capps discloses molded products made from plant waste products high in cellulose and silica, such as rice hulls. Prior to molding, these materials are converted by pretreatment into a slurry of water and a silicate cross-linked cellulose polymer by digestion under heat and pressure in the presence of sodium ions and a sulfite. The slurry is sometimes treated with conventional foaming agents as by injection of gas to form a foamed product expanded in volume. The foamed product is molded into any desired shape or size. There is no reference to using this method for making food receptacles and it is doubtful from the nature of the materials added to the rice hulls during their chemical pretreatment that the molded product could be used as a food receptacle.

U.S. Pat. No. 4,627,551 to Kuo C. Shen discloses a process of making composite products from sugar containing lignocellulosic materials, such as sugarcane bagasse and stalks of sorghum, corn, sunflower, flax and the like, utilizing the residual sugars as a bonding and bulking agent. After receipt from the suppliers, the sugar-containing product is hammermilled and then pretreated as by drying the same prior to molding to produce lignocellulosic materials wholly composed of dried particles. These dried particles are combined with other lignocellulosic materials, in the absence of adhesive binders or bonding agents. The mix is then molded at a temperature of at least 180° C., and a pressure and for a time sufficient to compound the material into a composite product. The free sugars, i.e. lignocellulosic materials, act as a thermosetting adhesive binder, and provide both bonding and bulking effect. No uses of the product as food receptacles is disclosed.

German Patent DE 4027786 products are manufactured by baking, molding, casting, injection and extrusion processes. The product mixtures are made of exclusively vegetable origin or consist of a mixture of vegetable and animal components, that at least one of the components consist of a nature fiber that can be used as a foodstuff. In the preferred process disclosed, seeds, vegetables, fruit, and berries including ground fruits and tubers are put together, individually as varieties are combined and pulverized or crushed in a crushing mill. There is no reference in this patent to using primarily or wholly agrowaste materials or that the product produced is a food receptacle. Thus, in all the examples given, the agrowaste materials are combined with large numbers of other materials and so comprise only a minor portion of the molded product. Also, heat pretreatment of pulverized and/or crushed products takes place by a means of steam in different ph ranges without pressure in an autoclave with an agitator or a sealed container under atmospheric carbon dioxide or nitrogen pressure.

Figure 1:
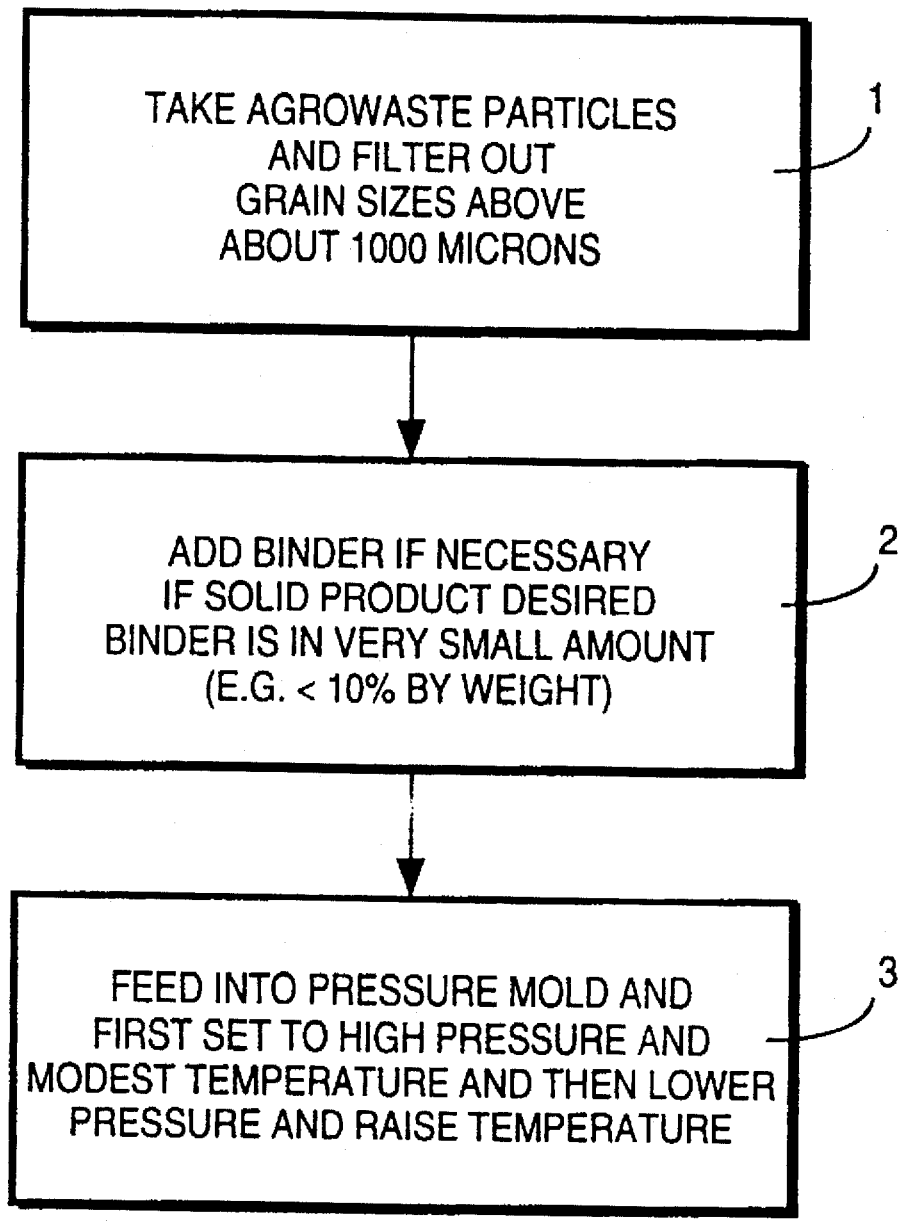
FIG. 1 is a block diagram illustrating some of the basic steps of the present invention.

DESCRIPTION OF EXEMPLARY FORMS OF THE INVENTION INCLUDING THOSE SHOWN IN THE DRAWINGS

While this invention is susceptible of embodiments in many different forms, there is shown in the drawings and will herein be described in detail preferred embodiments of the invention, with the understanding that the present disclosure is to be considered as an exemplification of the principles of the specific aspects of the invention and is not intended to limit the broad aspect of the invention to the embodiments illustrated.

FIG. 1 is a block diagram of the basic steps which are carried out in the making of the molded products by the basic method of the present invention when the particles are received from a commercial mill involved without additional grinding or chemical or physical pretreatment. As shown by block 1, the agrowaste particles received from the mill are preferably passed through a screen which separates out particles having a minimum or smallest dimension size above about 1000μ.

As shown by the next block 2, where necessary, a binder is then added which, for a solid molded product, would generally be less than 10% by weight of the binder-particle mix involved. This will coat the particles with sufficient binder to enable the binder-particle mix to be readily passed into a mold where it will substantially fill the entire mold without balling up in the mold. It would also provide enough binder material to securely bind the particles together when the binder-particle mix is subjected to the desired pressure and temperature conditions in the mold. Exemplary pressure and temperature conditions will be hereafter described. As shown by block 3, it is preferred that the initial mold pressures be quite high so as to squeeze additional inherent binder within the particles involved to the particle surfaces, and that the mold be heated to elevate the temperature of the particles in the mold to a temperature below that which would cause the binder to be solidified to become an effective binder in the mix involved. The pressure is then lowered to allow binder material which may have been forced to the periphery of the mold to reenter the interior of the binder-particle mix, to insure that binder action takes throughout the body of the mix involved. The mold is then simultaneously heated to a higher temperature to effect optimum binding action. The binder material is a material which requires elevated temperatures to effect bonding of the agrowaste particles though the formation of solid polymeric materials.

As previously indicated, in the preferred product produced by the method of the invention, unpretreated ground agrowaste particles make up the bulk, if not the entire molded product, especially if it is a non-foamed product. Most desirably, the agrowaste particles are corn, wheat, rice, soy or oat hulls or mixtures thereof. From 70 to 80% weight percent of the particles are generally sized between 250µ and 1000µ. This is the usual distribution and amount of particles which are received from the present commercial feed and food grain processing mills. In any event, the particles should have a size distribution such that smaller particles occupy the space between the larger particles, to ensure compact packing in the mold of the particles.

Figures 2A, 2B:
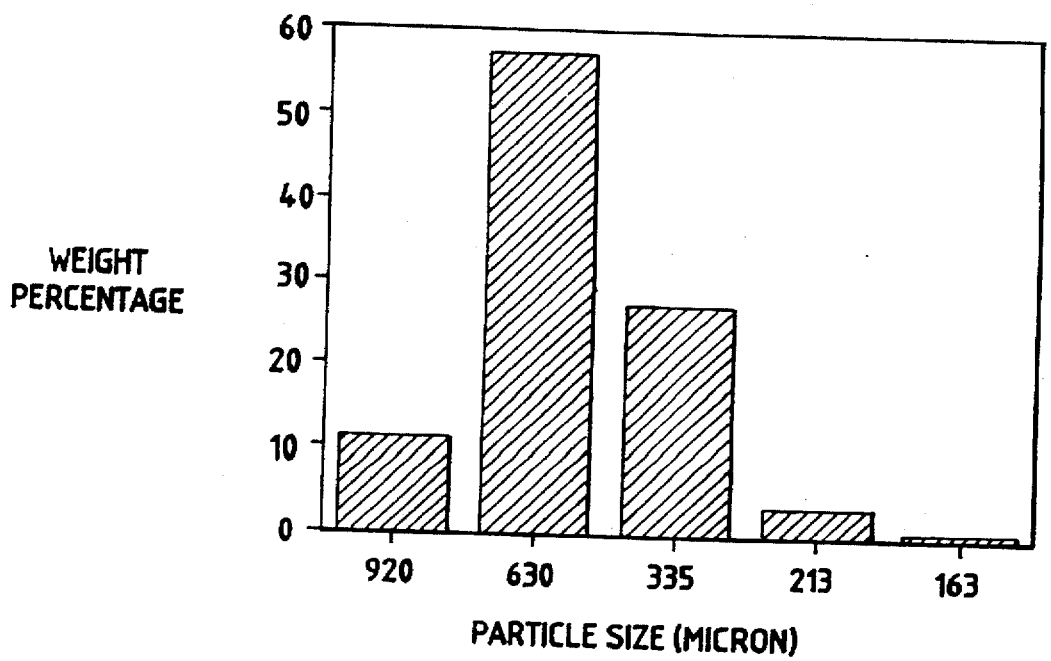
FIG. 2A shows a particle size distribution chart for rice hulls obtained by passing the hulls as received from commercial millers who grind up the hulls through a series of progressively decreasing sized screens which are vibrated or shaken.
FIG. 2B is a bar chart summarizing the particle size obtained from the screening results shown in FIG. 2A.
Figures 3A, 3B:
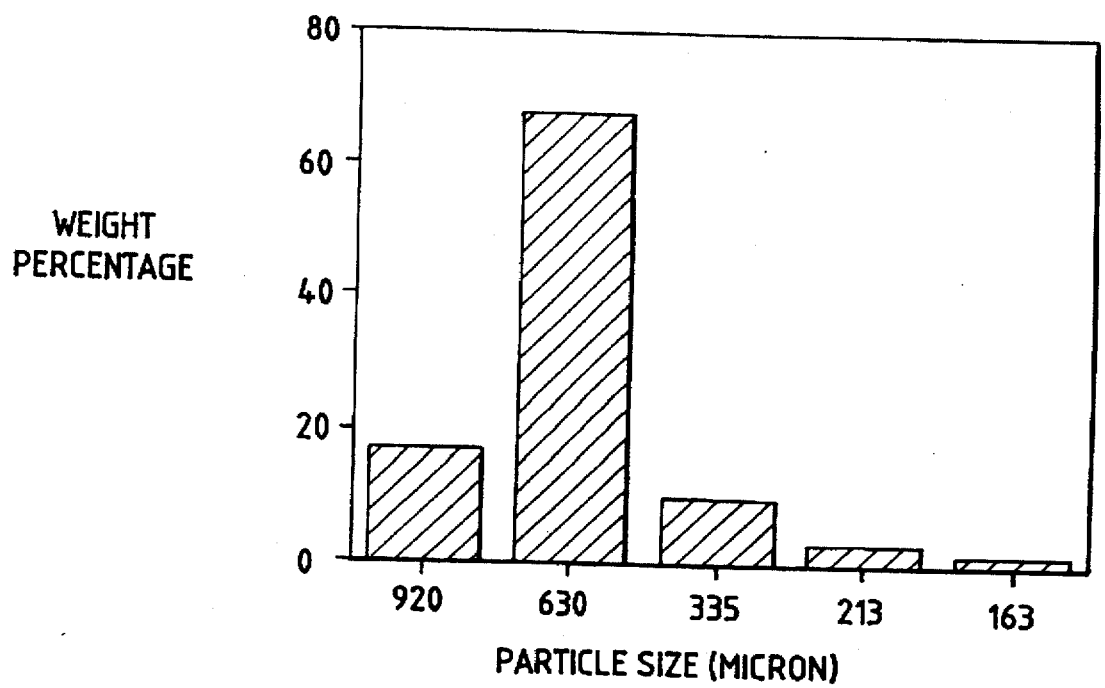
FIG. 3A shows a particle size distribution chart for wheat hulls obtained by passing the hulls as received from commercial millers who grind up the hulls through a series of progressively decreasing sized screens which are vibrated or shaken.
FIG. 3B is a bar chart summarizing the particle size obtained from the screening results shown in FIG. 3A.
Figures 4A, 4B:
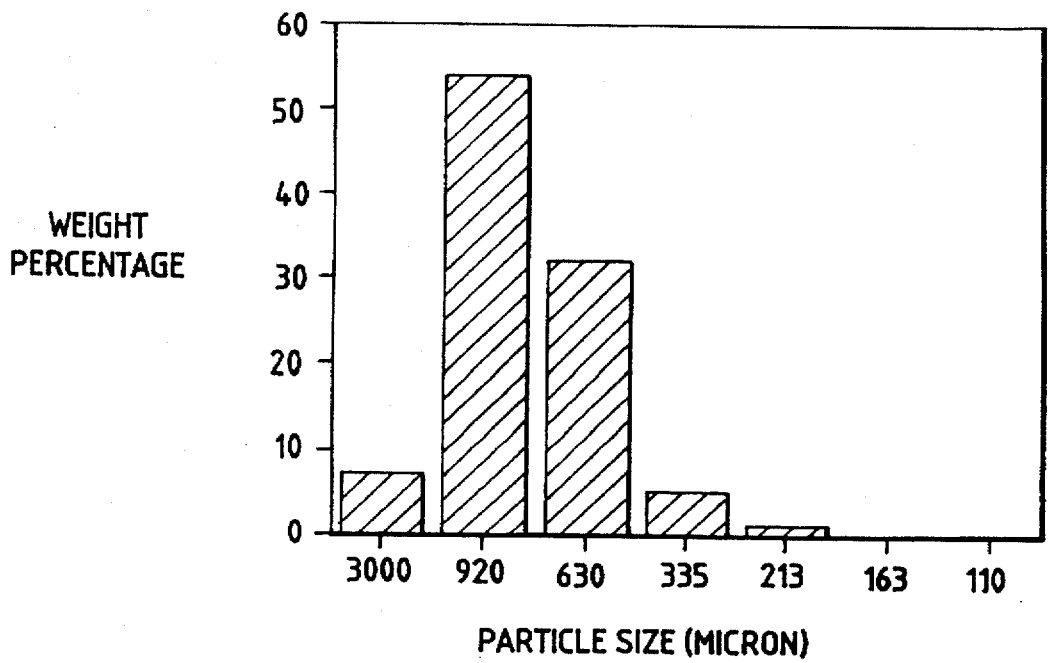
FIG. 4A shows a particle size distribution chart for soybean hulls obtained by passing the hulls as received from commercial millers who grind up the hulls through a series of progressively decreasing sized screens which are vibrated or shaken.
FIG. 4B is a bar chart summarizing the particle size obtained from the screening results shown in FIG. 4A.
Figure 5:
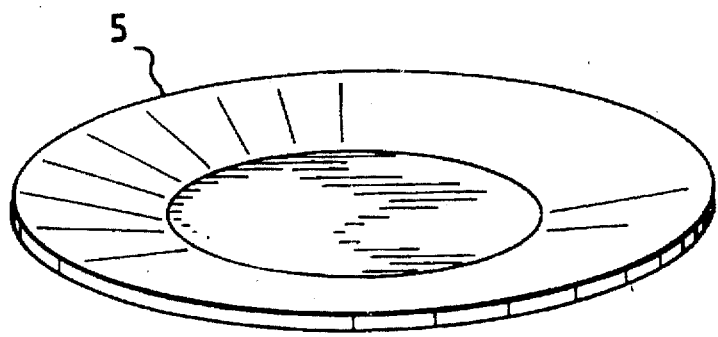
FIG. 5 shows a food receptacle plate made by a method of the present invention.
Figure 6:
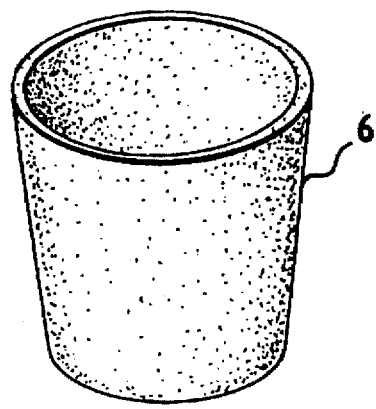
FIG. 6 shows a cup made by a method of the present invention.
Figure 7:
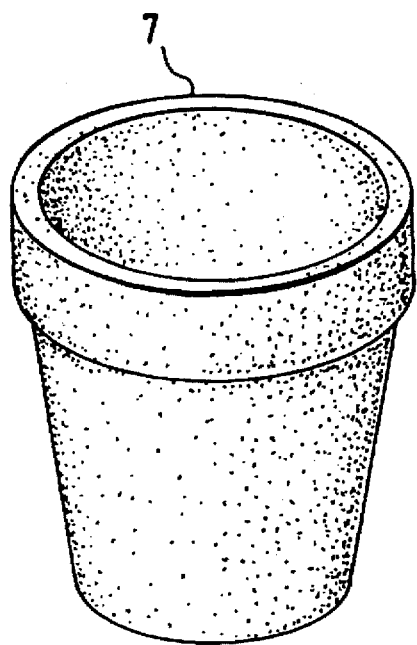
FIG. 7 shows a flower pot made by a method of the present invention.
Figure 8:
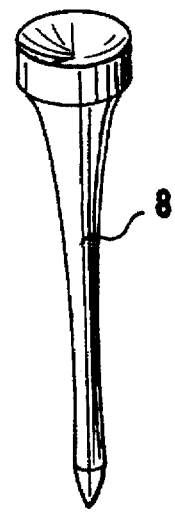
FIG. 8 shows a golf tee made by the method of the present invention.

These particle size specifications were obtained by passing the agrowaste particles received from the milling operations through a series of 10 to 100 mesh size screens, as shown in FIGS. 2A, 3A and 4A. In such case, the sizes given obviously refer to the smallest dimensions of the particle involved, since some of the particles have an elongated profile of undetermined length, but a smaller cross-sectional dimension to pass through the screens involved when the screens are vibrated to maximize the particles which pass through the screens involved.

While the costs of the agrowaste materials are minimized by utilizing the ground particles as obtained from the seed mills involved, in accordance with the broader aspects of the invention, it is contemplated that the manufacturers of the molded product could obtain agrowaste materials with a large portion of oversize particles and then carry out their own grinding operations. It is believed that the optimal range and weight amount of the particle sizes that would be utilized would be the same as those presently obtained from the commercial rice, wheat and soybean milling operations with screening out of the larger particle sizes, as above described.

Soybean hulls have an adequate amount of inherent binder that will be squeezed therefrom during the molding operation. Thus, no added binder is generally needed. Where the inherent binder supplies an inadequate amount of binder, natural edible oils in the amount preferably of about 1 to about 5 weight percent, is desirably added to the agrowaste particles, before or upon their introduction into the mold, to aid in their flow and uniform distribution in the mold. The amount of edible oil needed to be added is dependent upon the amount of inherent binder which is squeezed therefrom. Suitable natural oils include vegetable oils, such as corn and soy derived oils. The addition of natural oils also enhance the binding of the natural particles achieved under high temperature in the mold. Production of products of high strength may be achieved by varying the amount and type of natural oil added. It is especially desirable to utilize edible oils in the process and products of the invention since this should avoid any serious detrimental effect upon humans and will enable and encourage consumption of such materials by animals. The products of such edible oils that are formed in the molding process also remain biodegradable.

We have found it necessary to heat the mold to produce satisfactory products according to this invention. Preferred binder-curing mold temperatures are about 120° C. to about 230° C. Maximum mold pressures of about 0.25 to about 2.5 metric tons per sq. cm. are suitable to produce the biodegradable products of this invention, about 0.5 to about 1.25 metric tons per sq. cm. being preferred. Suitable times for application of the temperature and pressure in the mold depend upon the thickness of the molded article. The mold is allowed to cool and the product removed in finished form.

In a preferred embodiment, a first stage of high pressure and low temperature is applied to release the oil contained in the natural particles and uniformly distribute the particles in the mold. The particles are then preferably heated to a temperature of about 80° to 100° C., so that these temperatures can then be raised to the binder-curing temperature described above in a short period of time. In the second stage of the process the mold pressure is decreased and the temperature of the particle-binder mix is raised to a desired curing temperature in the range above described.

By the terminology "molding" as used herein, we mean to include pressure molding, transfer molding and injection molding. It is also contemplated that such molding processes may be used in combination with other procedures known in the art, such as extrusion. Conventional machinery as known to the art for these types of molding may be used in the process of this invention.

The appearance and aroma of products produced according to this invention may be modified by addition of natural materials for such modification without affecting the desired full biodegradability of the products. For example, we have found that addition of ground coffee beans to coffee cups produced according to this invention provides the pleasant aroma of gourmet coffee. Likewise, other spices, such as ground cinnamon, vanilla, saffron or sugar, powdered milk and the like may be added. Food coloring agents approved by the U.S. food and drug administration may also be added to mask or modify the natural brown color of the molded products. At least less than about 15 weight percent, and preferably much less than about 10 weight percent, of aroma and/or color modifiers should be used.

Foamed products which are fully biodegradable may be produced by the process of this invention as described above in a number of ways, such as by use of not less than about 3 and not more than about 15 weight percent sodium bicarbonate and/or ammonium bicarbonate and citric acid or other chemical foaming agents approved by the U.S. Food and Drug Administration for direct contact with food products. Foamed products can be produced according to this invention having a density of about 10 to about 50 percent less than the non-foamed product. The foamed fully biodegradable products according to this invention having lower thermal conductivity are especially suited for use as containers for high temperature food or beverages.

The following examples are set forth using specific materials and process conditions to aid in the understanding of this invention and should not be considered to limit it in any way.

EXAMPLE I

Ground rice hulls are obtained from a commercial milling process of a size range shown by FIG. 2A and screened to remove particles higher than 1000μ. These particles are mixed with 4% by weight of an edible oil like corn oil. This particle-binder mix is fed to a heated mold which heats the particle-binder mix to a temperature of about 125° C. for about 3 minutes. A force of 5 metric tons is applied to the mold during this period which applies this force over 7.2 sq. cm. of the product being molded. Then the mold pressure the force is decreased to about 2 metric tons and the temperature of the mold is increased to heat the particle-binder mix to about 150° C. for 10 minutes. The mold is cooled and the molded product removed.

EXAMPLE II

Ground wheat hulls are obtained from a commercial milling process of a size range shown by FIG. 3A and screened to remove particles higher than 1000μ. These particles are mixed with 6% by weight of an edible oil like soy oil. This particle-binder mix is fed to a heated mold which heats the particle-binder mix to a temperature of about 120° C. for about 3 minutes. A force of 4 metric tons is applied to the mold during this period which applies this force over 7.2 sq. cm. of the product being molded. Then the mold pressure the force is decreased to about 1.5 metric tons and the temperature of the mold is increased to heat the particle-binder mix to about 185° C. for 5 minutes. The mold is cooled and the molded product removed.

EXAMPLE III

Ground soybean hulls are obtained from a commercial milling process of a size range shown by FIG. 4a and screened to remove particles bigger than 1000μ. This particle-binder mix is fed to a heated mold which heats the particle-binder mix to a temperature of about 120° C. for about 5 minutes. A force of 7 metric tons is applied to the mold during this period which applies this force over 7.2 sq. cm. of the product being molded. Then the mold pressure the force is decreased to about 2 metric tons and the temperature of the mold is increased to heat the particle-binder mix to about 145° C. for 10 minutes. The mold is cooled and the molded product removed.

EXAMPLE IV

Thin bars, 62.0×12.5×2.0 mm, were produced from ground soy hulls. The natural particles were sized from 180μ to 425μ by screening out other particle sizes were fed to a mold heated to 120° C. While it is preferred to use the milled product with particle sizes greater than about 1000μ removed to simplify the process, a more limited range of particle sizes were used in this and the following examples by screening procedures. A force of 7 metric tons was applied to the mold for 20 seconds, following which the force was decreased to 2 metric tons and the temperature increased to 145° C. and held at that temperature and pressure for 10 minutes. The mold was cooled to 60° C. and the molded product removed. The molded product had a brown color with a smooth, hard surface and had sufficient strength to resist breaking between the fingers.

EXAMPLE V

Similar bars to those described in Example IV were produced from ground hominy particles sized to 180μ to 425μ. The natural particles were fed to a mold heated to 100° C. and a force of 5.5 metric tons applied to the mod for 30 seconds. The force was then decreased to 3 metric tons and the temperature raised to 160° C. and temperature and pressure maintained for 16 minutes. The mold is cooled to 55° C. and the molded product removed. The molded product had a brown color with a smooth, hard surface and had sufficient strength to resist breaking between the fingers.

EXAMPLE VI

Similar products to those described in Example IV were produced from ground rice hulls sized to 180μ to 425μ. The natural particles were fed to a mold heated to 130° C. and a force of 8 metric tons was applied to the mold for 2 seconds. The force was decreased to 4 metric tons and the temperature increased to 165° C. and temperature and pressure maintained for 10 minutes. The mold was cooled to 55° C. and the molded product removed. The product had a brown color with a smooth, hard surface and had sufficient strength to resist breaking between the fingers.

EXAMPLE VII

Similar bards to those described in Example VI were produced from ground wheat hulls sized to 250μ to 425μ. The natural particles were fed to a mold at room temperature. The mold was heated to 130° C. and a force of 10 metric tons was applied to the mold for 2 seconds. The force was decreased to 5 metric tons and the temperature increased to 180° C. and held at that temperature and pressure for 21 minutes. The mold was cooled to 65° C. and the product removed. The product had a brown color with a smooth, hard surface and had sufficient strength to resist breaking between the fingers.

EXAMPLE VIII

The rate of water absorption by the bars produced according to Examples IV–VII was determined by two testing procedures as set forth in ASTM D570. In the first test, the bars were placed in boiling water at 100° C. for 30 minutes and were then placed in water at room temperature, 23° C., for an additional 15 minutes. In a second test, the bars were placed in water at about 90° C. and allowed to gradually cool by surrounding air, dropping to about 45° C. after about 30 minutes. The second test closely simulates the conditions experienced by a container for hot beverages, such as coffee. The weight percent of water absorption are shown in Table 1.

TABLE 1

| Material | Weight Percent Water Absorbed | |
| --- | --- | --- |
| | Test 1 | Test 2 |
| Soy | 91 | 40 |
| Hominy | 89 | 40 |

TABLE 1-continued

| Material | Weight Percent Water Absorbed | |
|---|---|---|
| | Test 1 | Test 2 |
| Rice | 90 | 59 |
| Wheat | 70 | 35 |

EXAMPLE IX

The rate of heat transfer through the bars made in accordance with Examples IV–VII was obtained by measuring the surface temperature rise for the solid sample when the opposite surface was in contact with a heating element maintained at 100° C. The results, together with comparison to polystyrene and polystyrene foam, are shown in Table 2.

TABLE 2

| Material | Surface Temperature °C. after | | |
|---|---|---|---|
| | 5 Min. | 10 Min. | 15 Min. |
| Rice | 69 | 70 | 70 |
| Wheat | 66 | 67 | 67 |
| Soy Bean | 65 | 66 | 66 |
| Hominy | 63 | 65 | 65 |
| Polystyrene (solid) | 54 | 55 | 55 |
| Polystyrene Foam | 46 | 47 | 48 |

It is seen from Table 2 that the foamed product can be expected to exhibit about 15 percent less heat transfer than the solid material.

EXAMPLE X

The break flexibility strength of the bars made in Examples IV–VII was tested according to ASTM Method D790, Text Method 2, Procedure A and the results are shown in Table 3.

TABLE 3

| Material | Stress (psi) | Displacement (in) |
|---|---|---|
| Corn | 1117 | 0.02652 |
| Wheat | 3478 | 0.04124 |
| Rice | 2190 | 0.04579 |
| Soy | 1797 | 0.0461 |

EXAMPLE XI

The shear modulus of the bars made in Examples I, II and IV measured at 25° and 100° C. with the results shown in Table 4.

TABLE 4

| Material | Shear Modulus G (psi × 10$^5$) | | |
|---|---|---|---|
| | at 25° C. | at 100° C. | G (100° C.)/G(25° C.) |
| Wheat | 1.90 | 1.10 | 0.58 |
| Corn | 1.4 | 0.92 | 0.66 |
| Soy | 1.20 | 0.45 | 0.38 |

EXAMPLE XII

Ground corn hulls average sized 180μ were the only material placed in an "Engle" type injection molding machine with a heatable mold and subjected to an injection pressure or 1000 Kg/cm$^2$ and a temperature of 180° C. for a duration of injection molding of 8 minutes, producing discs having diameters of 90 mm and 1–2 mm thickness. The product discs had a smooth, mirror-like surface and high shape stability.

XIII

A foamed product was produced using wheat hull particles sized to 250 to 425μ which were mixed in a ball mill with 12 weight percent powdered sodium bicarbonate for 30 minutes. The mixture was fed to a mold heated to 195° C. A force of 8 metric tons was applied to the mold for 2 minutes following which the force on the mold was released and the mold cavity increased by 1 mm by opening to atmospheric pressure. The mold was held in this condition for 16 minutes at 195° C. The mold was then cooled to 65° C. and the molded product removed. The molded foam product had a density of 15 percent less than the corresponding solid molded product.

In the foregoing specification, this invention has been described in relation to certain preferred embodiments thereof, and many details have been set forth for the purpose of illustration. It will be apparent to those skilled in the art that the broadest aspect of the invention is susceptible to additional embodiments and that certain of the details described herein can be varied considerably without departing from the broadest aspects of the invention.

We claim:

1. A method of making a molded product from a particle-binder mix comprising the steps of:

grinding agricultural waste plant material into particles, feeding the particles into a mold, subjecting the particles in the mold to a modest elevated temperature lower than a temperature to cause binding action, and a relatively high pressure which squeezes inherent binder materials in the agricultural waste particles to the surface thereof, then, in a subsequent method stage reducing the mold pressure to a substantially reduced level which allows some of the binder material squeezed to the periphery of the mold to re-enter the interior of the mix, while raising the temperature of the mix to a relatively high value for a given period of time to bind the particles.

2. A method of making a molded product from a particle-binder mix comprising the steps of grinding up agricultural waste plant material to produce particles having a range of sizes, so that, when compressed in a mold, the smaller particles substantially fill the spaces between the much larger particles; feeding said particles with said range of sizes into a pressure mold which compacts the particles to form a product of the desired size and shape; subjecting the particles fed to the mold to a first method stage of a modest elevated temperature below that which would produce a desired binding action by the binder material and a relatively high pressure which squeezes inherent binder materials from the agricultural waste particles to the surfaces thereof; and, subjecting said particles in the mold to a subsequent method stage of a substantially reduced pressure and a further elevated temperature which causes the binder material to provide a desired particle-binding action.

3. The method of claim 1 or 2 wherein at least about 70% of the weight of the particles fed to the mold pass through 10 but not 80 vibrated mesh screens.

4. The method of claim 1 or 2 wherein the particles fed to the mold are at least 60% by weight agrowaste particles having a smallest dimension size range down to as little as 250μ.

5. The method of claim 1 or 2 wherein the particles fed to the mold have a smallest dimension size no greater than about 1000μ.

6. The method of claim 1 or 2 wherein the particles which are molded are at least about 60% by weight agricultural waste particles and have a smallest dimension size range down to at least about 250μ and no greater than about 1000μ.

7. The method of claim 1 or 2 wherein the only binder in the mold is an inherent binder squeezed from the particles.

8. The method of claim 1 or 2 wherein the agricultural waste particles fed to the mold, exclusive of any added binder material, are at least 90% by weight of the materials which are molded.

9. The method of claim 8 wherein the binder, if added, is much less than 10% of the weight of the material which is molded.

10. The method of claim 1 or 2 wherein an edible oil is added to the particles before subjecting the particles to said subsequent method stage.

11. The method of claim 1, or 2 wherein chemical foaming agents are added to the particles; and the particle mix is heated in said mold to a temperature which will cause said foaming chemicals to form voids in the molded product to form a receptacle with insulating qualities.

12. The method of claim 1 or 2 wherein the agricultural waste particles are one or more of the group consisting of wheat, rice, oat, soybean and corn hulls.

13. The method of claim 1 or 2 wherein said modest elevated temperature is in the range of from about 100° C. to about 130° C.

14. The method of claim 1 or 2 wherein said relatively high pressure is in the range of from about 700 to about 1500 kilograms per square centimeter.

15. The method of claim 1 or 2 wherein said substantially reduced pressure is in the range of from about 350 to 750 kilograms per square centimeter.

16. The method of claim 1 or 2 wherein said substantially reduced pressure is approximately half of said relatively high pressure.

17. The method of claim 1 or 2 wherein the molded product is a golf tee.

18. The method of claim 1 or 2 wherein said molded product is a leak-proof food receptacle.

19. The method of claim 1 or 2 wherein said molded product is a flower pot.

20. The method of claim 2 wherein said reduced pressure allows some of the binder material squeezed to the periphery of the mold to re-enter the interior of the particle-binder mix.

21. The method of claim 2 wherein said modest elevated temperature aids in enabling the squeezed inherent binder to flow to the particle surface.

22. The method of claim 2 wherein said first stage lasts only for a relatively short duration and said second stage lasts for a relatively long period.

23. The method of claim 22 wherein said first stage lasts for much less than a minute and said second stage lasts many minutes.

* * * * *